United States Patent Office 3,436,444
Patented Apr. 1, 1969

3,436,444
METHOD FOR MAKING POROUS STRUCTURES
William R. Von Tress, Lake Jackson, and James H. Enos, Angleton, Tex., assignors to The Dow Chemical Company, Midland, Mich., a corporation of Delaware
No Drawing. Filed Oct. 11, 1965, Ser. No. 494,886
Int. Cl. B29d 27/08
U.S. Cl. 264—44    4 Claims

ABSTRACT OF THE DISCLOSURE

This invention relates to a novel process for making strong, durable porous bodies from calcined dolomite wherein predetermined amounts of dolomite and a carbonaceous fuel are blended and sufficient water added to produce a paste-like composition which is molded to a desired shape, dried and heated under controlled conditions at from about 3 to about 24 hours thereby burning out the carbonaceous fuel. Following this step, the material is heated at a minimum temperature of 2400° F. for a period of from about 0.1 to about 1 hour after which it is cooled.

---

This invention relates to porous structures and more particularly is concerned with a novel process for preparing porous briquets of calcined dolomite.

Porous structures of refractory mineral-type materials, i.e. metal oxides, -silicates, -carbonates and the like are suitable for use as sound and thermal insulators, carriers for catalysts and other materials, filters and as reactants or reactant-carriers. To illustrate, a recent novel development of great commercial potential is the use of aluminum and magnesium oxide to produce magnesium in situ by reaction within a ferrous melt. The resulting magnesium serves to desulfurize the melt and in the case of grey cast iron also to effect nodularization of the graphite contained therein.

One convenient way for blending aluminum or an aluminum alloy with magnesium oxide to produce the noularizing agent is to impregnate a porous magnesium oxide containing material, e.g. calcined dolomite with the molten aluminum source material.

Now, unexpectedly a novel process has been discovered whereby porous structures of magnesium oxide-calcium oxide mixtures, particularly dead-burned (calcined) dolomite readily can be prepared. A principal advantage of the present novel process is that the resulting pore size of the final structure can be controlled. Also, the product has excellent resistance to crumbling, dusting and cracking and exhibits a good structural strength; these properties are not inherently obtained in briquets formed from calcined dolomite by employing compression forces or sintering conditions. Further, the porous product does not contain binders which could be detrimental in such a product. Additionally, the magnesium oxide values in the porous structure are readily available for reaction with an aluminum source material carried by the pores when used as a treating agent for ferrous melts.

Ordinarily, in accordance with the present novel process, a mixture of particulate magnesium oxide and calcium oxide is dry blended with a particulate solid carbonaceous material. This blend is mixed with water to give a thick paste. The resulting paste is cast, extruded or otherwise formed into a predetermined shape. The formed articles are hardened, heated at a moderately elevated temperature, and calcined at a high temperature.

Usually in carrying out the present novel process, a mixture of finely divided, i.e. having a maximum particle size of about 100 mesh U.S. Standard Sieve, magnesium oxide and calcium oxide ranging from about 15 to about 85 parts by weight MgO and from about 5 to about 80 parts by weight CaO is employed. Conveniently dead-burned (calcined) dolomite which ordinarily contains about 40 parts by weight MgO and about 58 parts by weight CaO, as well as trace amounts of other oxides can be employed. With this latter material additional particulate MgO or CaO, if needed or desired, can be added to provide the hereinbefore specified operable quantities of magnesium oxide and calcium oxide in the mixture.

The magnesium oxide-calcium oxide mixture is dry blended with a solid carbonaceous fuel which is substantially stable up to about 500° F., i.e. having a melting or decomposition point at above about 500° F. and which burns out, i.e. is removed by oxidation, at a minimum temperature of about 1100° F. The proportions of carbonaceous fuel/MgO-CaO mixture to be employed range from about 40/60 to about 60/40 on a weight basis. Ordinarily, the solid carbonaceous fuel employed has a maximum particle size of about 30 mesh, U.S. Standard Sieve and preferably ranges from about 40 to about 100 mesh U.S. Standard Sieve. Coke, sawdust, phenol-formaldehyde resins, carbon, coal, charcoal and the like materials are suitable carboneaceous fuel materials for use in the practice of the present invention.

Water is added and mixed into the dry blend of coke-metal oxides in quantities to form a thick, substantially non-flowable paste. The actual amount of water to be employed is not critical other than at a minimum it must be sufficient to wet the mix sufficiently to provide a thick paste which can be formed into a predetermined integral shape and at a maximum must not allow a shaped briquet or structure to "slump" after forming. With calcined dolomite-coke blends usually water in an amount of from about 20 to about 30 weight percent based on the weight of dry blend is employed.

The substantially homogeneous, paste-like mix is formed into an article of predetermined shape as by molding, extruding, pressing and the like forming operations and the so-formed product hardened ordinarily at about room temperature for a period of from about one hour to about 18 hours or more.

The hardened, shaped structure is then heated to remove water therefrom. At atmospheric pressures temperatures of from about 200° F. to about 500° F. usually at from about 250 to about 450° F. are employed. Lower temperatures can be utilized if a reduced pressure is maintained during the heating. The time required for water elemination is dependent on the size of structure being heated and temperatures employed. Smaller structures require less time than do larger size briquets and other structures. Lower temperatures also require longer periods for the drying operation. With a coke-calcined dolomite cylindrical briquet about 1.5 inches in diameter by 2 inches tall formulated with about 20 percent water, heating at about 450° F. for about 3-4 hours gives a substantially anhydrous structure.

After the initial drying, the article is heated to 2400° F. or higher at a heating rate slow enough to assure substantially complete removal, i.e. burn out, of the carbon material before 2400° F. is reached. Ordinarily the dried structure is heated at a temperature of from about 1100 to about 1850° F. to burn out the carbonaceous fuel. The time required for this operation varies inversely with the temperature. To illustrate, with a coke-calcined dolomite structure at about 1850° F., the coke is substantially completely burned out within about 3 hours; at about 1100° F. time up to 24 hours may be required.

Following removal of the fuel, the resulting porous structure is heated at a temperature of from about 2400–3000° F. or higher, preferably from about 2450 to about 2500° F. for about 0.1 to 1 hour or more and then cooled. This last heating stage provides a strengthening of the porous structure and assures removal of all oxidized carbonaceous matter from the product.

The porous structures resulting from the present novel process are strong and resistant to crumbling. They can be stored for extended periods of time in closed containers without any detrimental loss of strength.

The following examples will serve to further illustrate the present invention but are not meant to limit it thereto.

Example 1.—Pulverized calcined dolomite (maximum particle size about 100 mesh, U.S. Standard Sieve) consisting of about 40 parts by weight MgO and about 58 parts by weight CaO with no significant amount of impurities were dry blended with about an equal weight of crushed coke (~30 to 40 mesh, U.S. Standard Sieve). Water in an amount of about 20 weight percent of the total weight of the dry blend was admixed therewith forming a substantially homogeneous mass in the form of a thick paste. The resulting paste was pressed into cylindrical molds about 1.25 inches in diameter and about 2 inches long. The cylinders were hardened in the molds at room temperature for periods ranging from about one to about 18 hours.

After the curing period, the cylinders were removed from the molds and heated in an oven at atmosheric pressure and about 450° F. for about 3 to 4 hours. The cylinders were placed in an oven at a temperature of about 1200° F. and heated to a temperature of about 1850° F. over a two hour period and held at this temperature for an additional 2 hours. The furnace temperature then was raised to about 2500° F. over a 3 hour period. The cylinders were held at this temperature for several minutes, removed from the furnace and cooled.

The resulting product was found to be a substantially carbon-free porous structure, the pore sizes of which were about the same size and shape as the carbon granules used in the original blend. This porous structure had a good structural strength and was not easily crumbled.

In a second study, the same procedure and reactants were employed except that the coke size was about minus 20 to plus 30 mesh U.S. Standard Sieve and the weight proportions of the powdered calcined dolomite to coke was 60/40. The resulting porous cylinder exhibited good structural strength and a high resistance to crumbling.

Cylinders from both batches were placed in a closed vessel containing aluminum. The assembly was heated to about 1100° F. under a reduced pressure, the cylinders being immersed in the molten aluminum. The closed system then was backfilled with argon to relieve the low pressure and the cylinders removed from the aluminum melt and cooled. Examination of sections of the resultant products showed that metal impregnation was substantially complete throughout all the cylinders.

When these briquets were used to treat a grey cast iron melt following standard plunging techniques, the residual iron product had an acceptable (0.02–0.04 percent) residual magnesium content. Also, the free graphite in the cast article was substantially all in spheroidal form.

Example 2.—A dry blend of 40 parts by weight minus 100 mesh U.S. Standard Sieve calcined dolomite and 60 parts by weight particulate coke (minus 40 to plus 50 mesh, U.S. Standard Sieve) was blended into a substantially homogeneous mass with about 30 percent by weight water, based on the weight of the dolomite-coke mixture. The paste was formed into cylinders as described for Example 1 and these hardened for about 1 hour at room temperature. After curing the cylinders were removed from the mold forms and heated in an oven at about 250° F. for about 4 hours. The so-dried cylinders were heated at about 1100° F. for about 24 hours and then at about 2450° F. for about 1 hour.

The resulting porous structure exhibited the same general porosity characteristics and good strength and resistance to crumbling as shown for the structures reported in Example 1.

In a manner similar to that described for the foregoing examples, a 50–50 parts by weight blend of coarse sawdust and a mixture of powdered magnesium oxide (15 parts by weight)-powdered calcium oxide (85 parts by weight) can be used to prepare strong porous structures. Similarly, particulate charcoal, coal, solid organic resins, or carbon and a blend of calcined dolomite with additional MgO within the ranges set forth herein can be formed into porous structures in accordance with the present invention.

We claim:

1. A process for preparing a porous structure which comprises:
   (a) blending a mixture of particulate magnesium oxide and calcium oxide, a solid carbonaceous fuel and water, the weight proportions of said magnesium oxide-calcium oxide mixture/carbonaceous fuel ranging from about 40/60 to about 60/40 on a weight basis, said water being sufficient to produce a thick, substantially non-flowable paste, said mixture of magnesium oxide and calcium oxide comprising from about 15 to about 85 parts by weight magnesium oxide and from about 5 to about 80 parts by weight calcium oxide, said carbonaceous fuel being substantially stable up to about 500° F. and burning out at a minimum temperature of about 1100° F.,
   (b) forming the so-blended paste into an article of predetermined shape and hardening the resulting formed article, and
   heating said article to a temperature of from about 200 to about 500° F. at a heating rate such that the water is removed from said article before the temperature reaches 500° F.,
   heating the dried article at a temperature of from about 1100° F. to about 1850° F. for a period of from about 3 to about 24 hours thereby to burn out said carbonaceous fuel and provide a porous structure of said magnesium oxide and said calcium oxide, and
   heating said porous structure at a minimum temperature of about 2400° F. for a period of from about 0.1 to about 1 hour.

2. The process as defined in claim 1 and including the steps of
   dry blending the magnesium oxide-calcium oxide mixture and carbonaceous fuel, and incorporating the water into the resulting dry blend.

3. The process as defined in claim 1 wherein the magnesium oxide-calcium oxide mixture is calcined dolomite having a maximum particle size of about 100 mesh, U.S. Standard Sieve and the carbonaceous fuel has a maximum particle size of about 30 mesh, U.S. Standard Sieve.

4. A process for preparing a porous structure which comprises:
   (a) blending calcined dolomite, coke and water into a thick paste, the weight proportions of said calcined dolomite/coke ranging from about 40/60 to about 60/40 on a weight basis, said water ranging from about 20 to about 30 percent of the total weight of said calcined dolomite and said coke, said calcined dolomite having a maximum particle size of about 100 mesh, U.S. Standard Sieve and said coke having a maximum particle size of about 30 mesh, U.S. Standard Sieve,
   (b) forming the so-blended paste into an article of predetermined shape,
   (c) hardening said article at about room temperature,
   (d) heating said hardened article at a temperature of from about 250 to about 450° F. thereby to dry said article, (e) heating said dried article at a temperature of 1850° F. for about 3 hours thereby to burn out said carbonaceous fuel and provide a porous structure of said calcined dolomite, the pores being of about the same size and shape as the coke particles originally in the blend,
(f) heating said porous structure at a temperature of from about 2450 to 2500° F. for a period of about 0.1 hour, and
(g) cooling the resulting porous structure.

References Cited
UNITED STATES PATENTS
1,939,638  12/1933  Hyde.
2,127,867  8/1938  Harvey.

ROBERT F. WHITE, Primary Examiner.
J. H. SILBAUGH, Assistant Examiner.

U.S. Cl. X.R.
264—66; 106—41